United States Patent
Ike et al.

(10) Patent No.: US 7,660,016 B2
(45) Date of Patent: Feb. 9, 2010

(54) IMAGE-PROCESSING APPARATUS, AN IMAGE-FORMING APPARATUS, AND A PROGRAM

(75) Inventors: Takahiro Ike, Tokyo (JP); Masanori Hirano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/584,674

(22) PCT Filed: Oct. 27, 2005

(86) PCT No.: PCT/JP2005/020148

§ 371 (c)(1),
(2), (4) Date: Mar. 18, 2009

(87) PCT Pub. No.: WO2006/046755

PCT Pub. Date: May 4, 2006

(65) Prior Publication Data

US 2009/0207453 A1    Aug. 20, 2009

(30) Foreign Application Priority Data

Oct. 29, 2004    (JP)    ............... 2004-314941

(51) Int. Cl.
*H04N 1/40*    (2006.01)
*H04N 1/405*    (2006.01)
*G06K 15/00*    (2006.01)

(52) U.S. Cl. ............... 358/3.05; 358/3.03; 358/3.06; 358/3.21; 358/3.24

(58) Field of Classification Search ............... 358/1.9, 358/3.03, 3.05, 3.06, 3.15, 3.21, 3.22, 3.24, 358/3.26, 445, 447, 448, 465, 466, 521, 525; 382/251, 252, 260, 266, 267, 270, 300
See application file for complete search history.

(56) References Cited

U.S. PATENT DOCUMENTS 5,045,952 A    9/1991    Eschbach (Continued)

FOREIGN PATENT DOCUMENTS

EP    0414505 A2    2/1991

(Continued)

OTHER PUBLICATIONS

May 29, 2008 European Search Report in connection with counterpart European Patent application No. 05800529.9.

*Primary Examiner*—James A Thompson
(74) *Attorney, Agent, or Firm*—Cooper & Dunham, LLP (57) ABSTRACT

An image-processing apparatus for quantizing multi-level (M-level) image data into N-level values, where M>N>1, using a multi-level error-diffusion process or a minimum-average multi-level error method is disclosed.

The image-processing apparatus includes: means for outputting correction data; means for setting a quantization-threshold value; means for comparing the correction data and the quantization-threshold value so as to output N-level image data; and means for calculating an error generated with generating the N-level image data.

20 Claims, 8 Drawing Sheets

U.S. PATENT DOCUMENTS

| | | | |
|---|---|---|---|
| 5,268,774 A * | 12/1993 | Eschbach | 358/466 |
| 5,325,448 A | 6/1994 | Katayama et al. | |
| 5,515,180 A | 5/1996 | Maeda et al. | |
| 5,748,336 A | 5/1998 | Kakutani | |
| 5,748,794 A | 5/1998 | Maeda et al. | |
| 5,764,811 A * | 6/1998 | Kakutani | 382/252 |
| 6,501,566 B1 * | 12/2002 | Ishiguro et al. | 358/3.05 |
| 6,707,576 B1 * | 3/2004 | Chang | 358/1.9 |
| 6,731,817 B2 * | 5/2004 | Shibaki et al. | 382/252 |
| 2003/0169455 A1 | 9/2003 | Takahashi et al. | |

FOREIGN PATENT DOCUMENTS

| | | |
|---|---|---|
| EP | 0544511 A2 | 6/1993 |
| EP | 0767580 A2 | 4/1997 |
| EP | 1343305 A1 | 9/2003 |
| JP | 06-125456 | 5/1994 |
| JP | 10-257302 | 9/1998 |
| JP | 11-261819 | 9/1999 |
| JP | 2000-270210 | 9/2000 |
| JP | 2002-77608 | 3/2002 |
| JP | 3360391 | 10/2002 |
| JP | 2003-219161 | 7/2003 |
| JP | 2004-112089 | 4/2004 |

* cited by examiner

IMAGE-PROCESSING APPARATUS, AN IMAGE-FORMING APPARATUS, AND A PROGRAM

TECHNICAL FIELD

The present invention generally relates to an image-processing apparatus, an image-forming apparatus, and a program.

BACKGROUND ART

A pseudo-intermediate tone process is known as a method of converting, in an image input/output system for outputting to an output apparatus such as a printer or a display multi-value image data read with an input apparatus such as a scanner or a digital camera, the multi-level (eg. 256 tones for an 8-bit accuracy) image data read with the input apparatus into image data having a number of tones which the output apparatus can output and pseudo-representing successive tones.

As this pseudo-intermediate tone process, a bi-level process is conventionally performed when the output apparatus can only represent a bi-level of ON/OFF of a dot. As this bi-level process, there are an error-diffusion process and a minimum-average error method that produce superior resolution and tone. The error-diffusion and minimum-average error methods which differ only in when to perform an error-diffusing task are logically equivalent.

Moreover, there is a multi-level error-diffusion process as one to which this error-diffusion process is applied to the number of tones of not only two levels but also three or more levels. Similar to the bi-level error-diffusion process, this multi-level error-diffusion process again produces superior tone and resolution.

On the other hand, various methods are known for securing the number of tones of three or more levels in the output apparatus. For example, in an inkjet recording-type image-forming apparatus for dispensing ink droplets so as to form an image, reproducing the number of tones of three levels or more is performed by such as: a method of controlling the amount of droplets dispensed, thereby varying a dot diameter as small, medium, or large; a method of overprinting dots; or a method of using a recording liquid ink of varying concentrations or a variable-density ink. It is noted that the concentration of a low-density ink is generally diluted to between ⅙ and ½ of a high-density ink.

Moreover, in an electrophotographic-type image-forming apparatus, pulse-width dividing light exposure in light-exposure writing so as to control the amount of light exposure that one dot forms, and varying the strength of a laser light used in light exposure so as to modulate the dot diameter, etc., are performed.

Figure 10:
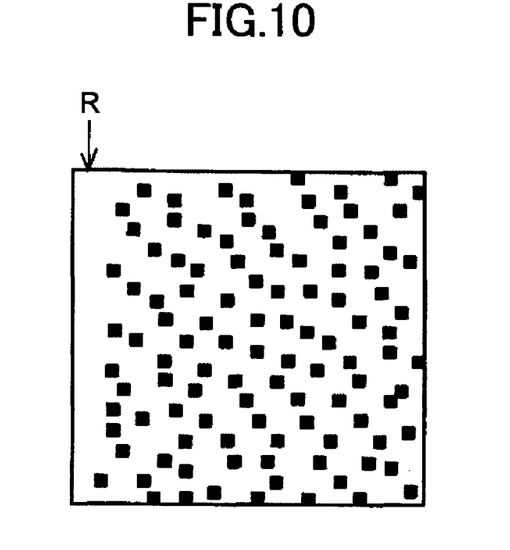
FIG. 10 is an explanatory diagram for explaining a delay in dot generation in a general error-diffused image.

Now, it is known as one problem of the error-diffusion process as described above that a pseudo-contour R is produced as shown in FIG. 10 in proximity to a white-background portion (tone value 0) or a solidly-shaded portion (tone value 255) due to a delay in dot generation.

As described in Japanese Patent Laid-Open Publication 07-111591 (Patent document 1), it is known, for example, to vary a threshold value depending on the concentration and to eliminate a delay in dot generation at a highlighted portion or a delay in hole generation at a solidly-shaded portion in the bi-level error diffusion.

Moreover, in the multi-level error-diffusion process, there is also a problem of decreased image quality due to a delay in dot generation in a portion such that an N-level quantization output changes.

Then, as described in Japanese Patent Laid-Open Publication 2003-219161 (Patent document 2), there is an image-forming apparatus comprising quantizing means for quantizing to N values for each pixel of an M-tone image (where M>N) according to the error-diffusion process using N−1 reference threshold values, wherein the M tones are divided into N−1 intervals and a threshold value in each interval is varied depending on the input tone value of the pixel in question.

Moreover, as described in Japanese Patent Laid-Open Publication 2004-112089 (Patent document 3), a configuration is known for solving a problem of a pseudo-contour being produced in a case of uneven intervals of tones when the concentration in the vicinity of a tone (a quantization level) which an output apparatus has is output, the configuration comprising: means for outputting correction data in which an error diffused from already-quantized pixels therearound is added to multi-level image data of a pixel in question; means for setting a quantization-threshold value based on the multi-level image data of the pixel in question; means for comparing the correction data and the quantization-threshold value so as to output N-level image data; and means for calculating an error generated when generating the N-level image data. The configuration is set such that, assuming quantized values are 1, 2, ..., a, b, ..., N and tones of the quantized values are O1, O2, ..., Oa, Ob, ..., ON, an i-th threshold value Thi (i being an integer where 0<i≦N−1) in an interval between Oa and Ob of an input value, when an input concentration value is set to be In, is a value set based on Thi=Ki×In+(Oa+Ob)*(1−Ki)/2−(Oa−Oi), Ki being a real number which is greater than or equal to zero and being an integer where 0<i≦N−1.

Figure 11:
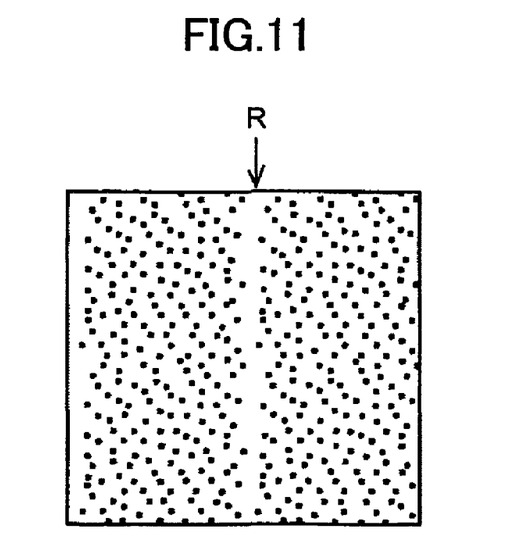
FIG. 11 is an explanatory diagram for explaining a pseudo-contour produced at their common border, when the images in FIG. 10 are placed in an adjoining manner.

However, while what is described in the Patent Document 1 solves a problem of an image distortion due to a delay in dot generation, it focuses attention on a single image or on an output result in a single error-diffusion process. Therefore, it does not address a problem of a pseudo-contour (a portion indicated with R in FIG. 11) being produced when adjoining and combining multiple error-diffused images or when dividing a single image into multiple areas so as to error-diffuse each of the areas.

Figure 12:
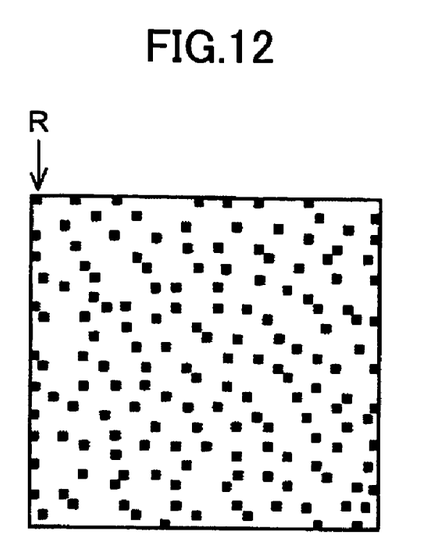
FIG. 12 is an explanatory diagram illustrating an error-diffused image in which the delay in dot generation is addressed.
Figure 13:
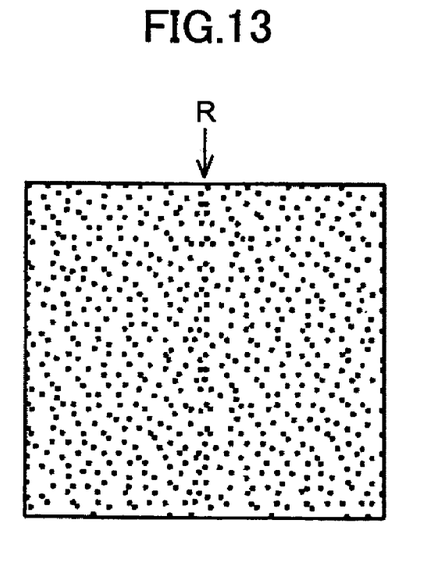
FIG. 13 is an explanatory diagram for explaining a pseudo-contour produced at their common border, when the images in FIG. 12 are placed in an adjoining manner.

Thus, there is a problem in that a pseudo-contour may be produced such as a portion indicated with R in FIG. 13 due to dots being generated too soon when the images are adjoined even when a delay in dot generation is improved such as a portion indicated with R in FIG. 12.

For a single image, dot generation being delayed or leading in an image-edge portion does not tend to be visually uncomfortable for humans. However, adjoining and combining such images together as described above causes a tendency of border portions to stand out and causes visual discomfort even with a small discontinuity, especially when both of the border portions are of the same tone.

Moreover, for such reasons as holding down the amount of memory used in the error-diffusion process, there is a case such that even a single image is divided into multiple small areas so as to error-diffuse for each of the image units. In such a case, it is likely that the same tone will continue in the process border so that a delay or a lead in dot generation is prone to becoming a problem.

There is a problem that in such a border at which the error-diffused image units adjoin, a stripe shape such that there is an empty gap (a portion indicated with R in FIG. 11) appears when there is a delay in dot generation while a dense stripe shape (a portion indicated with R in FIG. 13) appears when there is a lead in dot generation.

DISCLOSURE OF THE INVENTION

In light of the problems as described above, it is a general object of the present invention to provide an image-processing apparatus, an image-forming apparatus, and a program that prevent a stripe-shaped pseudo-contour, produced at a border where error-diffused processing units adjoin, from standing out, so as to reduce degradation in the image quality of the processed image, making it possible to divide the processing units into multiple small areas so as to thereby enable a reduction in the amount of memory use.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by the image-processing apparatus, the image-forming apparatus, and the program in the specification in such full, clear, concise, and exact terms as to enable a person having ordinary skill in the art to practice the invention.

To achieve these and other advantages and in accordance with the purpose of the invention, as embodied and broadly described herein, the invention provides as follows.

According to one feature of the present invention, there is provided an image-processing apparatus for quantizing multi-level (M-level) image data into N values, where M>N>1, using a multi-level error-diffusion process or a minimum-average multi-level error method, including: means for outputting correction data in which an error diffused from already-quantized pixels therearound is added to the multi-level image data of a pixel in question; means for setting a quantization-threshold value based on the multi-level image data of the pixel in question; means for comparing the correction data and the quantization-threshold value so as to output N-level image data; and means for calculating an error generated when generating the N-level image data, wherein, assuming quantized values are 0, 1, 2, ..., N−1, and tones of the quantized values are V0, V1, V2, ..., VN−1, at least one threshold value $Th_{a+1}$ in an interval between $V_a$ and $V_{a+1}$ (where $0 \leq a < N-1$) of at least one input value, when an input tone value is set to be v, is set based on equation (1):

$$Th_{a+1} = (\sqrt{((v-V_a)(V_{a+1}-V_a)/2))}) + V_a \qquad (1).$$

According to another feature of the present invention, there is provided an image-forming apparatus for quantizing input multi-level (M-level) image data into N values, where M>N>1, using a multi-level error-diffusion process or a minimum-average multi-level error method and forming an image using dots which correspond to each of the N values, including: means for outputting correction data in which an error diffused from already-quantized pixels therearound is added to the multi-level image data of a pixel in question; means for setting a quantization-threshold value based on the multi-level image data of the pixel in question; means for comparing the correction data and the quantization-threshold value so as to output N-level image data; and means for calculating an error generated when generating the N-level image data, wherein, assuming quantized values are 0, 1, 2, ..., N−1, and tones of the quantized values are V0, V1, V2, ..., VN−1, at least one threshold value $Th_{a+1}$ in an interval between $V_a$ and $V_{a+1}$ (where $0 \leq a < N-1$) of at least one input value, when an input tone value is set to be v, is set based on equation (1):

$$Th_{a+1} = (\sqrt{((v-V_a)(V_{a+1}-V_a)/2))}) + V_a \qquad (1).$$

According to another feature of the present invention, there is provided a program for causing a computer to execute a process of quantizing multi-level (M-level) image data into N values, where M>N>1, using a multi-level error-diffusion process or a minimum-average multi-level error method, including: a code for a step of outputting correction data in which an error diffused from already-quantized pixels therearound is added to the multi-level image data of a pixel in question; a code for a step of setting a quantization-threshold value based on the multi-level image data of the pixel in question; a code for a step of comparing the correction data and the quantization-threshold value so as to output N-level image data; and a code for a step of calculating an error generated when generating the N-level image data, wherein, assuming quantized values are 0, 1, 2, ..., N−1, and tones of the quantized values are V0, V1, V2, ..., VN−1, at least one threshold value $Th_{a+1}$ in an interval between $V_a$ and $V_{a+1}$ (where $0 \leq a < N-1$) of at least one input value, when an input tone value is set to be v, is set based on equation (1):

$$Th_{a+1} = (\sqrt{((v-V_a)(V_{a+1}-V_a)/2))}) + V_a \qquad (1).$$

BEST MODE FOR CARRYING OUT THE INVENTION

In the following, embodiments of the present invention are described with reference to the accompanying drawings. First, an image input/output system comprising an image-processing apparatus pertaining to the present invention is described with reference to FIG. 1.

Figure 1:
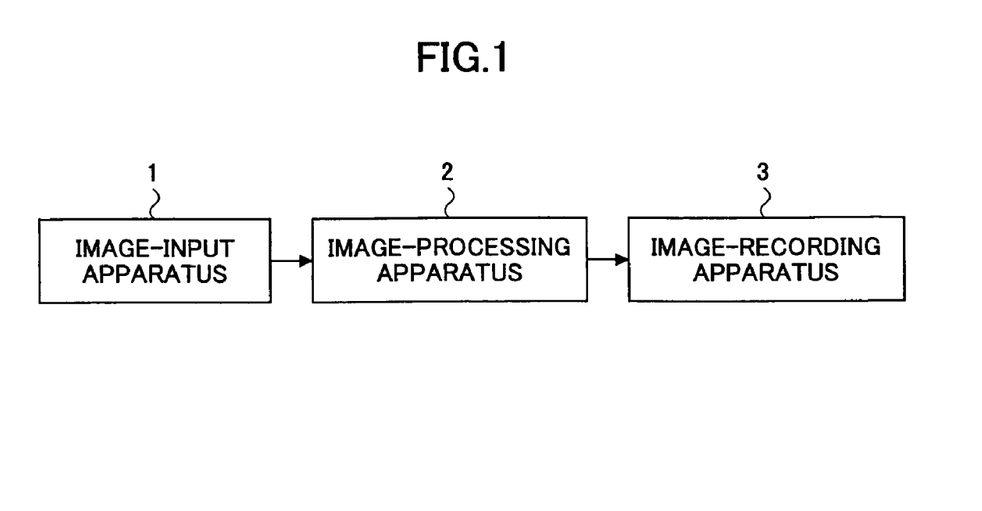
FIG. 1 is an explanatory block diagram for an image input/output system which includes an image-processing apparatus to which the present invention is applied.

This image input/output system comprises: an image-input apparatus 1 which is an input device such as a scanner or a digital camera; an image-processing apparatus 2 configured with a personal computer, etc., which includes processing means for quantizing multi-level (M-level) image data into N values (where M>N>1) using a multi-level error-diffusion process or a multi-level minimum average error method for taking in input-image (eg., 256-tone image for 8-bit accuracy) data from the image-input apparatus 1 and performing on this 256-tone image data necessary processes such as converting to a number of tones which it is possible to output at a later-stage image-output apparatus 3 so as to output as image data; and an image-forming apparatus 3 with which a three-tone representation is possible based on the image data from the image-processing apparatus 2 using dots per one-dot unit forming an image.

Figure 2:
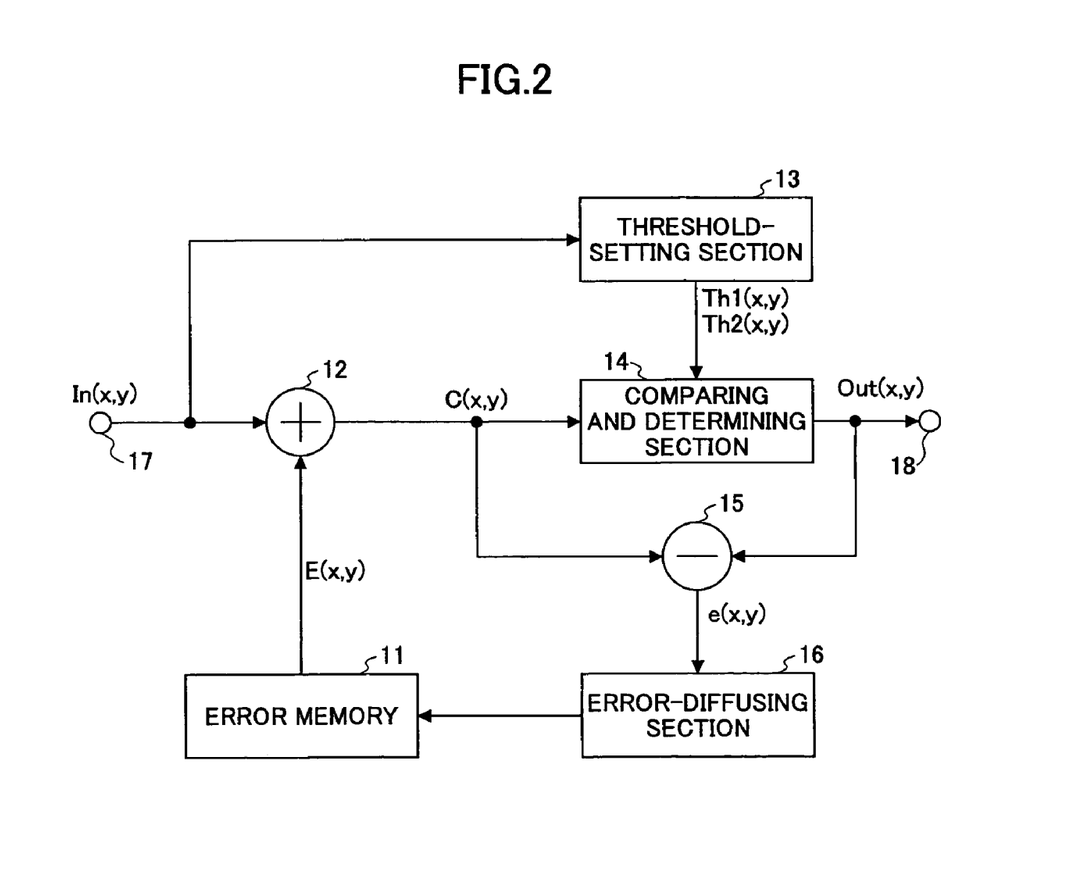
FIG. 2 is a functional block diagram of an image processor of the image-processing apparatus that pertains to the present invention.

Next, a portion related to the image processing pertaining to the present invention that is in the image-processing apparatus 2 is explained with reference to a functional-block diagram in FIG. 2.

The portion pertaining to the image processing (below referred to as "an image processor") comprises: an error memory 11 for storing errors which have been diffused and accumulated through an error-diffusion process preceding the current pixel; an adder 12 which is means for outputting correction data in which an error diffused from already-quantized pixels therearound that is read out from the error memory 11 is added to multi-level (M-level) image data of a pixel in question that are input; a threshold-setting section 13 which is means for setting a quantization-threshold value based on the multi-level image data of the pixel in question; comparing and determining section 14 for comparing the correction data from the adder 12 and the quantization-threshold value from the threshold-setting section 13 so as to output N-level image data; a subtractor 15 for calculating an error generated when generating the N-level image data; and an error-diffusing section 16 for performing an error diffusion based on the error from the subtractor 15 and diffusion coefficients set in advance.

In a such-configured image processor, multi-level image data are input from the image-input apparatus 1 using an input terminal 17. Here, a set of two-dimensional image data is represented as In (x, y). (x shows an address in a main-scanning direction of an image, while y shows an address in a sub-scanning direction.)

When the input data set In (x, y) is provided to the adder 12, the adder 12 inputs an error component E (x, y) allocated to the current pixel out of the errors diffused and accumulated through the error-diffusion process preceding the current pixel that are stored in the error memory 11 so as to add the error component to the input data set In (x, y) and output the added result as a correction data set C (x, y).

Moreover, the input data set In (x, y) is input to the threshold-value setting section 13 wherein a threshold value Th (x, y) for use in a multi-level error-diffusion process pertaining to the present invention is set.

Figure 3:
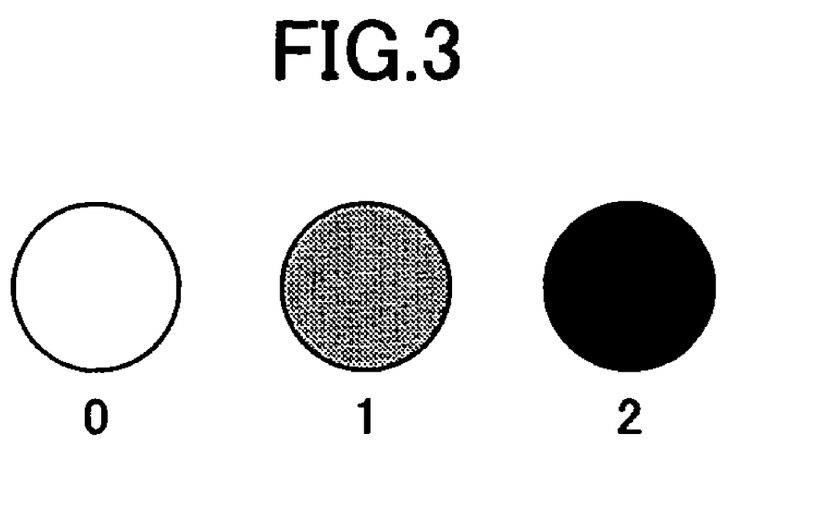
FIG. 3 is an explanatory diagram which is made available for explaining a three-level dot which is output at an image-forming apparatus to which the present invention is applied.

Note that, while the number of possible tones that the image-forming apparatus 3 can output is described as three-level for simplifying the explanation, it is a matter of course that a number of tones other than three-level is similarly applicable. Moreover, the image-forming apparatus 3 is to use a normal ink, and a low-density ink for which the normal ink diluted to ¼ is to be used. Furthermore, as illustrated in FIG. 3, the image-forming apparatus 3 is to represent the three levels as a dot off (0), a low-density ink dot (1), and a normal ink dot (2) so an explanation is provided with a dot-off (0) tone-value V0=0, a low-density ink-dot (1) tone-value V1=64, and a normal ink-dot (2) tone-value V2=255.

Here, with an input tone value being v, the threshold value Th is set according to an equation as stated below. In other words, When $0 \leq \text{In}(x, y) \leq 64$, threshold values $Th1(x,y)$ and $Th2(x,y)$ are set according to equations (2) and (3) below:

$$Th1(x,y) = (\sqrt{((v-V0)(V1-V0)/2)}) + V0 \qquad (2)$$

$$Th2(x,y) = (V1+V2)/2 \qquad (3)$$

Moreover, when $64 < \text{In}(x, y) \leq 255$, the threshold values $Th1(x,y)$ and $Th2(x,y)$ are set according to equations (4) and (5) below:

$$Th1(x,y) = (V0+V1)/2 \qquad (4)$$

$$Th2(x,y) = (\sqrt{((v-V1)(V2-V1)/2)}) + V1 \qquad (2)$$

In other words, when the input data set In(x, y) is $0 \leq \text{In}(x, y) \leq 64$, the threshold value $Th1(x,y)$ which is set with the equation (2) and the input data set In(x, y), and the threshold value $Th2(x,y)$ which is set with the equation (3) and the input data set In(x, y) are respectively output to the comparing and determining section 14. Moreover, when the input data set In(x, y) is $64 < \text{In}(x, y) \leq 256$, the threshold value $Th1(x,y)$ which is set with the equation (4) and the input data set In(x, y), and the threshold value $Th2(x,y)$ which is set with the equation (5) and the input data set In(x, y) are respectively output to the comparing and determining section 14.

The comparing and determining section 14 determines as follows an output-concentration value Out(x, y) based on a correction data set C(x, y) which is the input data set In(x, y) added with the error E(x, y) and on the threshold values $Th1(x,y)$ and $Th2(x,y)$ which are set at the threshold-setting section 13:

```
If (C(x,y)<Th1(x,y))
   then Out(x,y)=0
Else If (C(x,y)<Th2(x,y))
   then Out(x,y)=64
Else
   Then Out(x,y)=255
```

This Out(x, y) is output to the image-output apparatus 3 from an output terminal 18.

Moreover, the output value Out(x, y) is input to a subtractor 15 where the output value input is subtracted from the correction data C(x, y) so that the error e(x, y) produced at the current pixel is calculated.

Figure 4:
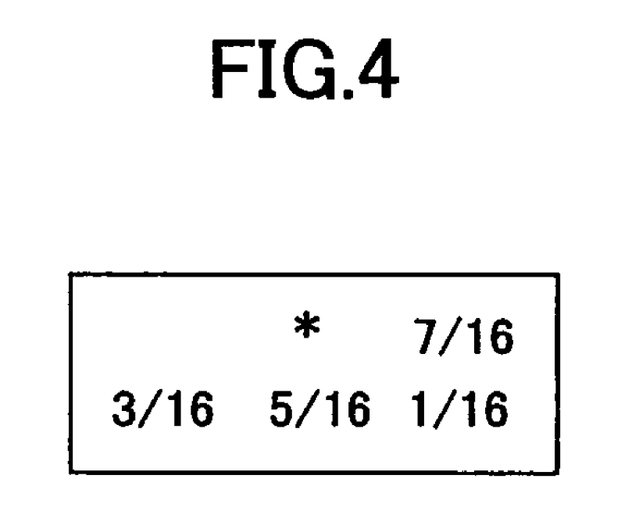
FIG. 4 is an explanatory diagram for explaining an example of error coefficients for use in an error-diffusing section of the image processor.

Next, based on diffusion coefficients set in advance, the error-diffusing section 16 allocates the error e(x, y) from the subtractor 15 so as to add it to the error data set E(x, y)

accumulated in the error memory 11. Here, the following process is performed in the error-diffusing section 16 when using coefficients as shown in FIG. 4 for the diffusion coefficients, for example:

$$E(x,y+1)=E(x,y+1)+e(x,y)\times 7/16$$

$$E(x+1,y-1)=E(x+1,y-1)+e(x,y)\times 3/16$$

$$E(x+1,y)=E(x+1,y)+e(x,y)\times 5/16$$

$$E(x+1,y+1)=E(x+1,y+1)+e(x,y)\times 1/16$$

Then, error data produced in this error-diffusion process are stored in the error memory 11.

Thus, this image-processing apparatus comprises means for outputting correction data in which an error diffused from already-quantized pixels therearound is added to multi-level image data of a pixel in question when quantizing multi-level (M-level) image data into N values (where M>N>1) using a multi-level error-diffusion process; means for setting a quantization-threshold value based on the multi-level image data of the pixel in question; means for comparing the correction data and the quantization-threshold value so as to output N-level image data; and means for calculating an error generated when generating the N-level image data. In the image-processing apparatus as described above, assuming quantized values are $0, 1, 2, \ldots, N-1$, and tones of the quantized values are $V0, V1, V2, \ldots, VN-1$, at least one threshold value $Th_{a+1}$ in an interval between $V_a$ and $V_{a+1}$ (where $0 \leq a < N-1$) of at least one input value, when an input tone value is set to be v, is set based on the equation below:

$$Th_{a+1}=(\sqrt{((v-V_a)(V_{a+1}-V_a)/2)})+V_a \quad (1)$$

Hereby, an interval of dot generation in a border portion of an error-diffusion process is optimized, making it possible to minimize pseudo-contours produced at a border when multiple error-diffused images are adjoined or when a single image is divided into multiple areas so as to error-diffuse the multiple areas; and reducing a degradation in the image quality of the processed image (improving the image quality of the processed image) so as to make it possible to divide the processing units into multiple small areas, thereby enabling a reduction in the amount of memory used. In other words, setting an interval between an image-border portion and where a dot is generated in a tone of an input value with the average dot interval in that tone as a reference, makes it possible to set a threshold value such that dot intervals become uniform even at the image-border portion, so as to prevent a stripe-shaped pseudo-contour produced at a border where images adjoin from standing out, and to reduce a degradation in or improve the image quality of the processed image, making it possible to divide the processing units into multiple small areas so as to thereby enable a reduction in the amount of memory used.

In this case, as described above, setting the threshold value based on the above equation (1) only when, in the input value interval between $V_a$ and $V_{a+1}$ (where $0 \leq a < N-1$), the input value v is larger than a constant $K_a$ (where $V_a < K_a < V_{a+1}$), or in other words, deactivating a function of setting the threshold value based on the above equation (1) with an arbitrary constant $K_a$ as a border makes it possible to avoid a detrimental effect caused by setting the threshold value based on the above equation (1) when convoluting to the input value variable elements such as random noise, blue noise, and white noise, etc. in error diffusion.

Moreover, obtaining threshold values $Th1(x,y)$ and $Th2(x,y)$ from the equations (2) through (5) and the input value through a sequential process in the above embodiment makes it possible to save memory in that a LUT (Look-Up Table) for keeping threshold values is not needed. On the other hand, computing threshold values Th1 and Th2 in advance for input-value 256 tones and storing the computed results in the LUT so as to use the stored results for obtaining the threshold values make it possible to speed up the process.

Furthermore, while an example of performing a multi-level error-diffusion process is described in the above embodiment, a case of using a minimum-average multi-level error method is similarly applicable as well.

Figure 5:
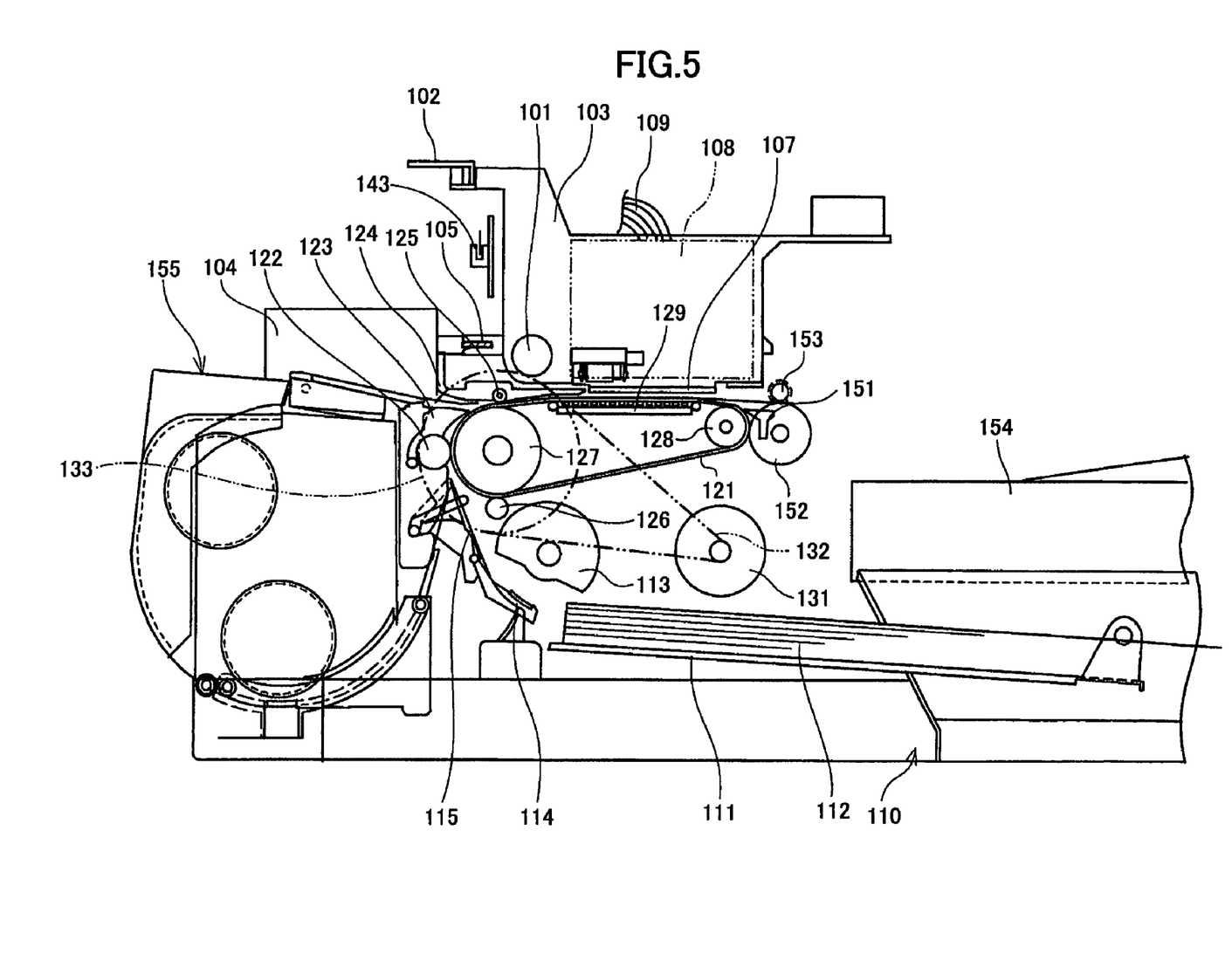
FIG. 5 is an explanatory side view for explaining an example of a mechanism section of the image-forming apparatus.

Next, an example of an image-forming apparatus pertaining to the present invention is described with reference to FIGS. 5 and 6. Note that FIG. 5 is an explanatory side view for explaining an overall configuration of the image-forming apparatus while FIG. 6 is an explanatory plan view of main part of the image-forming apparatus.

Figure 6:
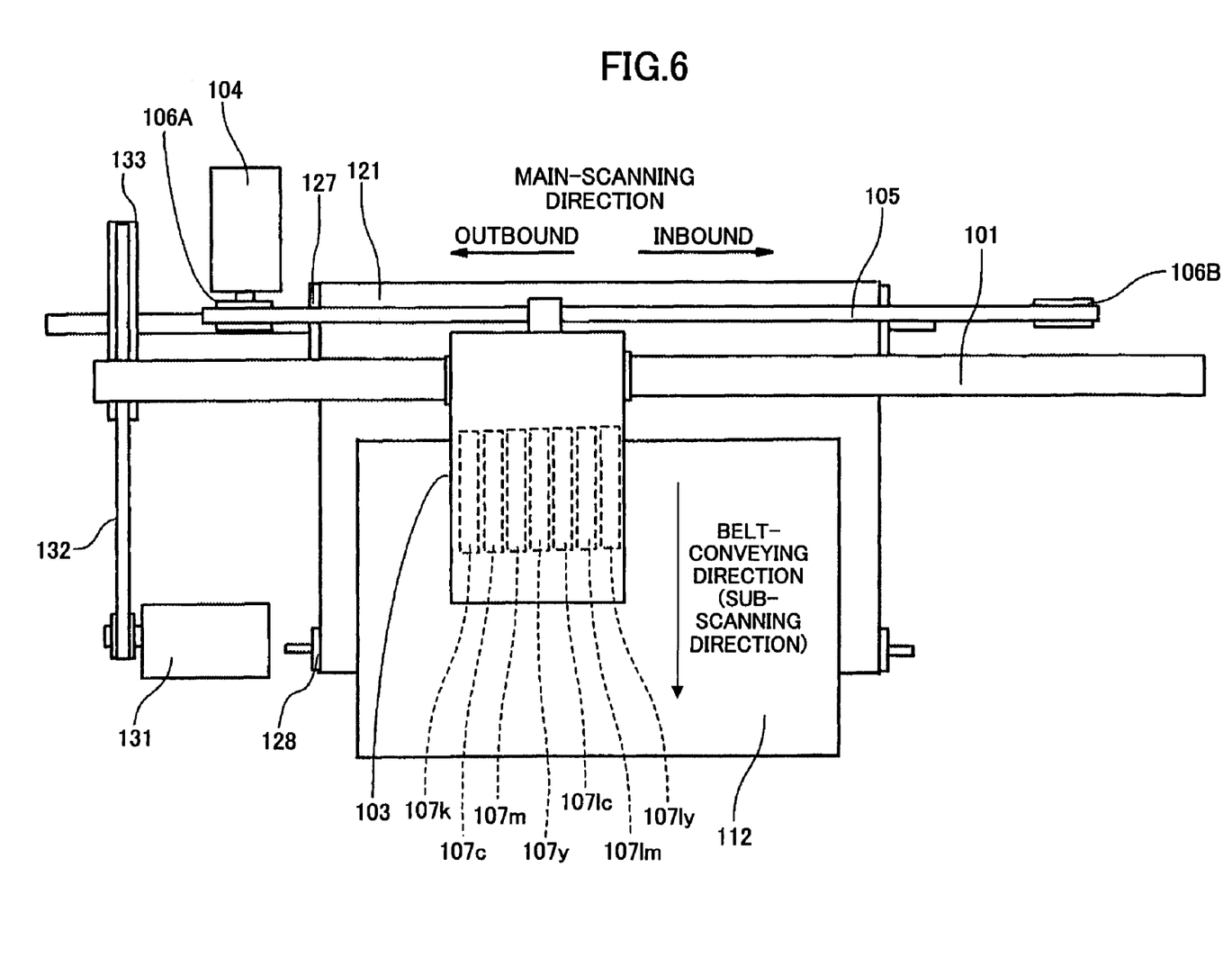
FIG. 6 is an explanatory plan view of a main part of the mechanism section of the image-forming apparatus.

In this image-forming apparatus a carriage 103 is supported with a guide rod 101 and a guide rail 102 which are guide members laid across side plates on the left and the right (not illustrated) such that it can slide in main-scanning directions, and a main scanning motor 104 moves and scans in arrow-indicated directions (the main-scanning directions) in FIG. 6 via a timing belt 105 which is wound around a drive pulley 106A and a driven pulley 106B.

Figure 7:
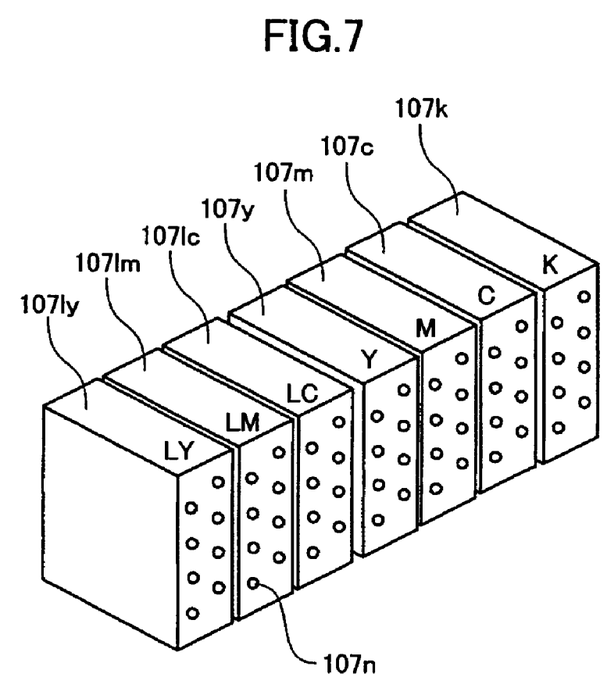
FIG. 7 is an explanatory perspective view for explaining a configuration of a recording head of the mechanism section of the image-forming apparatus.

For example as illustrated in FIG. 7, recording heads 107 are arranged in this carriage 103 in directions along the main-scanning directions and are put thereon such that liquid dispensing is in a downward direction, the recording heads 107 being configured from seven independent liquid-dispensing heads 107k, 107c, 107m, 107y, 1071c, 1071m, and 1071y for dispensing from nozzles 107n droplets (ink droplets) of recording liquids of each color of black (K), cyan (C), magenta (M), yellow (Y), light cyan (LC), light magenta (LM), and light yellow (LY).

Figure 8:
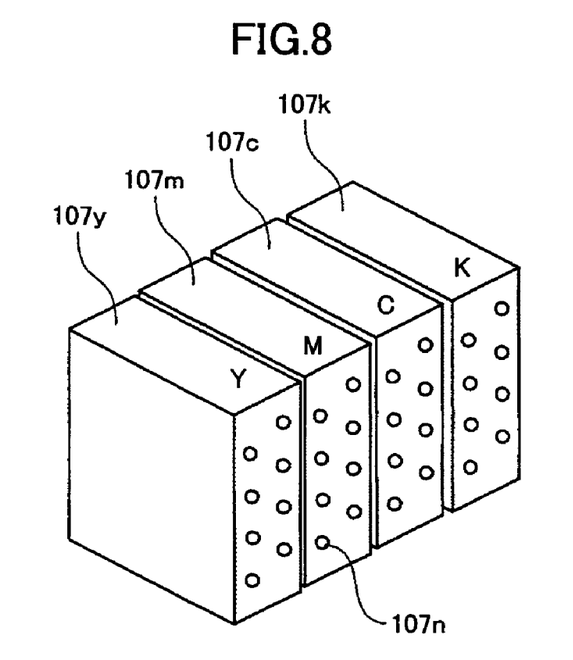
FIG. 8 is an explanatory perspective view for explaining another example of the configuration of the recording head of the mechanism section of the image-forming apparatus.

Note that while independent liquid-dispensing heads are used herein, it is also possible to use one or more heads having multiple nozzle columns for dispensing liquid droplets of recording liquids of each color. Moreover, the number and the arranged order of colors are not limited to what is described above so that a four-color head configuration, for example, is also possible as illustrated in FIG. 8. Furthermore, as a yellow dot in a highlighted portion has a property such that it is difficult to see, light yellow (LY) may also be omitted. Even more, the concentration of each color of light black, cyan, magenta, yellow, and black may be divided into three/four stages so as to achieve a high picture quality.

Any of the following may be used as actuators for the recording heads 107, what may be used are: a so-called piezo-type for deforming a vibrating plate which forms a wall face of an ink flow route using an electro-mechanical converting element such as a piezoelectric element as pressure-generating means for pressurizing ink within a pressurizing-liquid chamber so as to vary the volume within the ink flow route to dispense ink droplets; a so-called thermal-type for utilizing film boiling of the recording liquid using an electro-thermal converting element such as a heat-dissipating resistor; a so-called electrostatic-type for arranging the vibrating plate which forms the wall face of the ink flow route, and an electrode so that they face each other and deforming the vibrating plate with an electrostatic force generated between the vibrating plate and the electrode, thereby varying the volume within the ink flow route so as to dispense the ink droplets; and a shape-memory alloy actuator which uses metal-phase transition through varying temperatures.

In the carriage 103, subtanks 108 of each color for supplying the recording heads 107 the corresponding color are loaded. These subtanks 108 are replenished with ink supplied via an ink-supplying tube 109 from a main tank (not illustrated) which is detachably put on the apparatus itself.

On the other hand, as a paper-feeding section for feeding sheets of paper 112 loaded on a paper-loading section (a pressure plate) 111 such as a paper-feeding cassette 110, there are configured a half moon-shaped roller (a paper-feeding roller) 113 for separately feeding sheet by sheet the sheets of paper 112 from the paper-loading section 111; and a separating pad 114 facing the paper-feeding roller 113 that is made of a material having a large friction coefficient. The separating pad 114 is biased to the paper-feeding roller 113 side.

A conveying section for conveying, on the lower side of the recording head 107, the sheets of paper 112 fed from this paper-feeding section comprises: a conveying belt 121 for electrostatically attracting the sheets of paper 112 so as to convey them; a counter roller 122 for conveying the sheets of paper 122 fed from the paper-feeding section via a guide 115 such that they are sandwiched between the conveying belt 121 and itself; a conveying guide 123 for changing by generally 90 degrees a direction of the sheets of paper 112 which are fed in a generally upward direction so as to cause them to follow on the conveying belt 121; and a tip-pressurizing roller 125 biased to the conveying-belt side 121 with a fastening member 124. There is also configured a charging roller 126 which is charging means for charging a surface of the conveying belt 121.

Now, the endless conveying belt 121 is wound around a conveying roller 127 and a tension roller 128 so that the conveying roller 127 is rotated from a sub-scanning roller 131 via a timing belt 132 and a timing roller 133, thereby providing for it to continuously move around in a belt-conveying direction (the sub-scanning direction) in FIG. 6. Note that a guide member 129 corresponding to an image-forming region by the recording head 107 is arranged on the back-face side of the conveying belt 121.

The charging roller 126 which is in contact with a surface layer of the conveying belt 121 is arranged such that it is driven by the tangential linear motion of the conveying belt 121 so as to rotate and applies to each end of its axle 2.5 N as pressing force.

Moreover, a paper-outputting section for outputting the sheets of paper 112 that are recorded at the recording head 107 comprises: a separating claw 151 for separating the sheets of paper 112 from the conveying belt 121; a lower paper-outputting roller 152 and an upper paper-outputting roller 153; and a paper-outputting tray for stocking the sheets of paper 111 output.

Furthermore, a both-side paper-feeding unit 155 is detachably put on the back. This both-side paper-feeding unit 155 takes in the sheets of paper 112 that are returned with a rotation in a reverse direction of the conveying belt 121 so as to turn them upside down to again be fed between the counter roller 122 and the conveying belt 121.

In the image-forming apparatus thus configured, the sheets of paper 112 are separately fed from the paper-feeding section sheet by sheet, the sheets of paper 112 that are fed in the generally-upward direction are guided with the guide 115 and are conveyed such that they are sandwiched between the conveying belt 121 and the counter roller 122. Their leading edges are further guided with the conveying guide 123 so as to be fastened to the conveying belt 121 with the tip-pressing roller 125 and the conveying direction is changed by generally 90 degrees.

Here, an alternating voltage is applied by a control circuit (not illustrated) from an AC-bias supply to the charging roller 126, and the conveying belt 121 becomes charged with an alternating charged-voltage pattern, or a pattern such that a positive voltage and a negative voltage are alternately applied to predetermined widths in bands in the sub-scanning direction which is the conveying-belt 121 movement direction. When the sheets of paper 112 are fed onto the conveying belt-121 which is alternately charged with the positive voltage and the negative voltage, the sheets of paper 112 are electrostatically attracted to the conveying belt 121, and are conveyed in the sub-scanning direction with the movement of the conveying belt 121.

Then, by driving the recording heads 107 depending on the image data from the image-processing apparatus 2 while moving the carriage 103 in outbound and inbound directions, ink droplets are dispensed on one of the sheets of paper 112 at rest so as to record the space corresponding to one line and, after conveying the one sheet of paper 112 by a predetermined amount, recording for the next line is performed. Once a recording-completion signal or a signal that the trailing edge of the one sheet of paper 112 has reached a recording region is received, the recording operation is terminated and the one sheet of paper 112 is output to the paper-outputting tray 154.

Moreover, in a case of printing both sides, by rotating the conveying belt 121 in the reverse direction when recording of the front face (a face which is printed first) is finished, the recorded sheets of paper 112 are fed into the both-side paper feeding unit 155, and the sheets of paper 112 are turned upside down (the back face is set to be a printing face) so as to be again fed between the counter roller 122 and the conveying belt 121, a timing control is performed, and the sheets of paper 112 are conveyed on the conveying belt 121 as described above so as to be recorded on the back face after which they are output to the paper-outputting tray 154.

Figure 9:
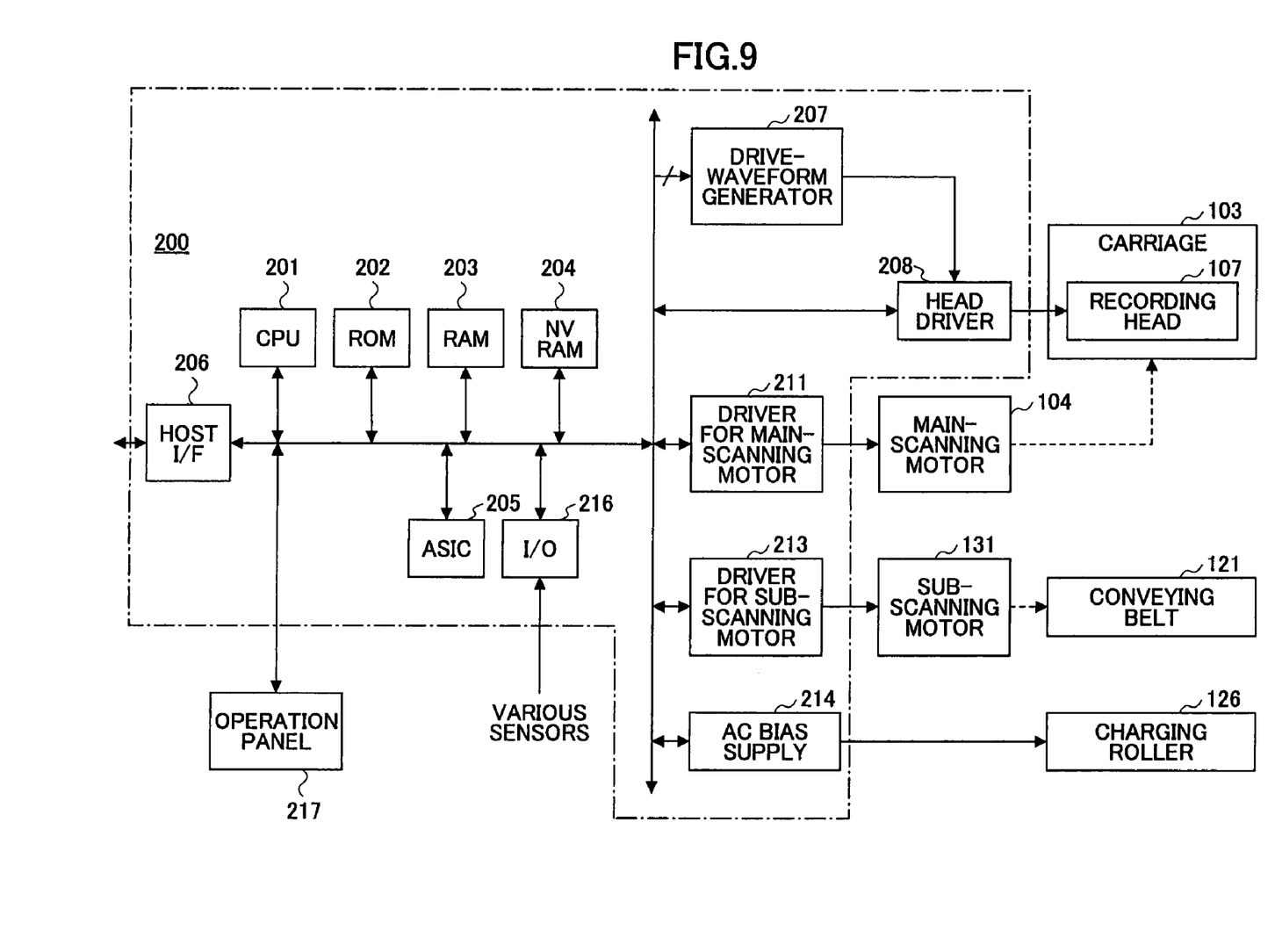
FIG. 9 is an explanatory block diagram illustrating an overview of a control section of the image-forming apparatus.

Next, an overview of a control section of this image-forming apparatus is described with reference to FIG. 9. Note that this diagram is an explanatory block diagram illustrating an overview of the control section.

This control section 200 comprises a CPU 201 which is responsible for controlling the overall apparatus; a ROM 202 for storing programs which the CPU 201 executes and other fixed data; a RAM 203 for temporarily storing image data, etc.; a non-volatile memory (NVRAM) for keeping data even during the period in which the power of the apparatus is shut down; and an ASIC 205 for performing various signal processing on the image data, image processing for performing sorting, etc., and processing input/output signals for controlling the whole apparatus.

Moreover, this control section 200 comprises an I/F 206 for sending/receiving data and signals with the host side which is an image-processing apparatus (or a data-processing apparatus) such as a personal computer; a drive-waveform generator 207 for generating a drive waveform for driving the recording heads 107; a head driver 208 for driving and controlling the recording heads 107; a driver for main-scanning motor 211 for driving the main-scanning motor 104; a driver for sub-scanning motor 213 for driving the sub-scanning motor 131; an AC-bias supply 214 for supplying an AC-bias voltage to the charging roller 126; and an I/O 216 for inputting sense signals from various sensors (not illustrated).

Moreover, an operation panel 217 for inputting and displaying information necessary for this apparatus is connected to this control section 200.

Now, the control section 200 receives at the I/F 206 via a cable or a network printing data including image data from the host side such as the image-processing apparatus 2 such as the personal computer.

Then, the CPU 201 reads out and analyzes the printing data within a receive buffer included in the I/F 206, and performs necessary image processing and data sorting operations, etc., at the ASIC 205 so as to transfer the image data to the head driver 208.

The drive-waveform generator 207, which is configured from a D/A converter for D/A converting drive-signal pattern data, outputs a drive waveform comprising one or more drive signals to the head driver 208. The head driver 208 selectively applies to the actuators of the recording heads 107 the drive signals configuring the drive waveform provided from the drive-waveform generator 207 based on image data (dot-pattern data) corresponding to one line of the recording heads 107 that are input serially, so as to drive the heads.

In this image-forming apparatus 3, as illustrated in FIG. 3 described previously, dots to be output are controlled. An "0" indicates that dots are not placed (a dot off), "2" indicates that dots are placed with a normal ink concentration (normal ink), and "1" indicates that dots can be placed that are of a low-concentration ink (low-density ink) which is the normal ink in "2" diluted.

Moreover, generating and outputting multiple drive waveforms from the drive-waveform generator 207 which allows for dispensing droplets of varying sizes within one drive period, for instance, as the drive waveforms as described above for selectively providing from multiple drive waveforms to the recording heads 107, also makes it possible to adopt a dot-diameter modulating method for placing dots of four different levels of large, medium, small, and null.

Note that while an ink-jet recording-type image-forming apparatus is described as an image-forming apparatus for forming an image output from the image-processing apparatus 2 in the embodiment as described above, similarly applying an electronic photo-type image-forming apparatus and an thermal transfer-type image-forming apparatus to the embodiment is also possible. In the electrophotographic-type image-forming apparatus, pulse-width dividing light exposure in a light-exposure writing so as to control the amount of light exposure that one dot forms, thereby representing multi-level tones, and varying the strength of a laser light used in light exposure, thereby representing multi-level tones are possible.

Moreover, while the embodiment above describes the image-processing apparatus comprising an image processor pertaining to the present invention, the image-input apparatus may comprise the image processor as well as the image-forming apparatus comprising the image processor. Furthermore, the present invention may be applied to a system configured from multiple equipment units (for example, a host computer, an interface-equipment unit, a reader, a printer, etc.) as well as to an apparatus configured from one equipment unit (for example, a copy machine, a facsimile apparatus).

Even more, it is possible to configure a software program for causing a computer to execute the operations of the image processor pertaining to the present invention that are described in the above embodiment. In this case, the program pertaining to the invention comprises a code for a step of outputting correction data in which an error diffused from already-quantized pixels therearound is added to multi-level image data of a pixel in question; a code for a step of setting a quantization-threshold value based on the multi-level image data of the pixel in question; a code for a step of comparing the correction data and the quantization-threshold value so as to output N-level image data; and a code for a step of calculating an error generated when generating the N-level image data. In the program as described above, assuming quantized values are $0, 1, 2, \ldots, N-1$ and tones of the quantized values are V0, V1, V2, ..., VN-1, at least one threshold value $Th_{a+1}$ in an interval between $V_a$ and $V_{a+1}$ (where $0 \leq a < N-1$) of at least one input value, when an input tone value is set to be v, is set based on the equation (1) as described above.

The program may also be achieved by supplying to a system or an apparatus a storage medium in which the program codes are recorded so that a computer (a CPU or a MPU) of the system or the apparatus reads out and executes the program codes stored in the storage medium. In this case, the program codes themselves read out from the recording medium implement the functions of the embodiment as described previously.

As a recording medium for supplying the program codes, such media as a flexible disk, a hard disk, an optical disk, a magneto-optical disk, a magnetic tape, a non-volatile memory card, a ROM, a USB memory, etc., for example, may be used.

Moreover, a case is also included such that not only the functions of the embodiment as described above are implemented by executing the program codes which the computer read out but also the functions of the embodiment as described above are realized by the OS (Operating System), etc., running on the computer performing a part or all of the actual process based on instructions of the program codes.

Furthermore, a case is also included such that the functions of the embodiment as described above are realized by, after the program codes read out from the storage medium are written into a memory configured in a functional-extension board inserted into the computer or in a functional-extension unit connected to the computer, the CPU, etc., configured in the functional-extension board or the functional-extension unit performing a part or all of the actual process based on instructions of the program codes.

The invention claimed is:

1. An image-processing apparatus for quantizing multi-level (M-level) image data into N values, where M>N>1, using a multi-level error-diffusion process or a minimum-average multi-level error method, comprising:
    means for outputting correction data in which an error diffused from already-quantized pixels therearound is added to the multi-level image data of a pixel in question;
    means for setting a quantization-threshold value based on the multi-level image data of the pixel in question;
    means for comparing the correction data and the quantization-threshold value so as to output N-level image data;
    and means for calculating an error generated when generating the N-level image data;
    wherein, assuming quantized values are $0, 1, 2, \ldots, N-1$, and tones of the quantized values are V0, V1, V2, ..., VN-1, respectively at least one threshold value $Th_{a+1}$ in an interval between $V_a$ and $V_{a+1}$ (where $0 \leq a < N-1$) of at least one input value, when an input tone value is v, is set based on equation (1), where the equation (1) is:

$$Th_{a+1} = (\sqrt{((v-V_a)(V_{a+1}-V_a)/2))}+V_a.$$

2. The image-processing apparatus as claimed in claim 1, wherein the threshold value is set based on said equation (1) only when, in the input value interval between $V_a$ and $V_{a+1}$ (where $0 \leq a < N-1$), the input value v is greater than a constant $K_a$ (where $V_a < K_a < V_{a+1}$).

3. The image-processing apparatus as claimed in claim 2, wherein the threshold value is obtained through a sequential process depending on the input value v.

4. The image-processing apparatus as claimed in claim 2, wherein the threshold value is obtained from a look-up table depending on the input value v.

5. The image-processing apparatus as claimed in claim 1, wherein the threshold value is obtained through a sequential process depending on the input value v.

6. The image-processing apparatus as claimed in claim 1, wherein the threshold value is obtained from a look-up table depending on the input value v.

7. An image-forming apparatus for quantizing input multi-level (M-level) image data into N values, where M>N>1, using a multi-level error-diffusion process or a minimum-average multi-level error method and forming an image using dots which correspond to each of the N values, comprising:
  means for outputting correction data in which an error diffused from already-quantized pixels therearound is added to the multi-level image data of a pixel in question;
  means for setting a quantization-threshold value based on the multi-level image data of the pixel in question;
  means for comparing the correction data and the quantization-threshold value so as to output N-level image data;
  and means for calculating an error generated when generating the N-level image data;
  wherein, assuming quantized values are 0, 1, 2, N−1, and tones of the quantized values are V0, V1, V2, ..., VN−1, respectively at least one threshold value $Th_{a+1}$ in an interval between $V_a$ and $V_{a+1}$ (where 0≦a<N−1) of at least one input value, when an input tone value is v, is set based on equation (1), where the equation (1) is:

$$Th_{a+1}=(\sqrt{((v-V_a)(V_{a+1}-V_a)/2)})+V_a.$$

8. The image-forming apparatus as claimed in claim 7, wherein the threshold value is set based on said equation (1) only when, in the input value interval between $V_a$ and $V_{a+1}$ (where 0≦a<N−1), the input value v is greater than a constant $K_a$ (where $V_a<K_a<V_{a+1}$).

9. The image-forming apparatus as claimed in claim 8, wherein the threshold value is obtained through a sequential process depending on the input value v.

10. The image-forming apparatus as claimed in claim 9, wherein the image is formed with one of an electrophotographic method, an ink-jet method, and a thermal transfer method.

11. The image-forming apparatus as claimed in claim 8, wherein the threshold value is obtained from a look-up table depending on the input value v.

12. The image-forming apparatus as claimed in claim 11, wherein the image is formed with one of an electrophotographic method, an ink-jet method, and a thermal transfer method.

13. The image-forming apparatus as claimed in claim 8, wherein the image is formed with one of an electrophotographic method, an ink-jet method, and a thermal transfer method.

14. The image-forming apparatus as claimed in claim 7, wherein the threshold value is obtained through a sequential process depending on the input value v.

15. The image-forming apparatus as claimed in claim 14, wherein the image is formed with one of an electrophotographic method, an ink-jet method, and a thermal transfer method.

16. The image-forming apparatus as claimed in claim 7, wherein the threshold value is obtained from a look-up table depending on the input value v.

17. The image-forming apparatus as claimed in claim 16, wherein the image is formed with one of an electrophotographic method, an ink-jet method, and a thermal transfer method.

18. The image-forming apparatus as claimed in claim 7, wherein the image is formed with one of an electrophotographic method, an ink-jet method, and a thermal transfer method.

19. A computer-readable medium storing a computer-executable program for causing a computer to execute a process of quantizing multi-level (M-level) image data into N values, where M>N>1, using a multi-level error-diffusion process or a minimum-average multi-level error method, comprising:
  a code for a step of outputting correction data in which an error diffused from already-quantized pixels therearound is added to the multi-level image data of a pixel in question;
  a code for a step of setting a quantization-threshold value based on the multi-level image data of the pixel in question;
  a code for a step of comparing the correction data and the quantization-threshold value so as to output N-level image data;
  and a code for a step of calculating an error generated when generating the N-level image data,
  wherein, assuming quantized values are 0, 1, 2, .... N−1, and tones of the quantized values are V0, V1, V2, ..., VN−1, respectively at least one threshold value $Th_{a+1}$ in an interval between $V_a$ and $V_{a+1}$ (where 0≦a<N−1) of at least one input value, when an input tone value is set to be v, is set based on equation (1), where the equation (1) is:

$$Th_{a+1}=(\sqrt{((v-V_a)(V_{a+1}-V_a)/2)})+V_a.$$

20. The computer-readable medium as claimed in claim 19, wherein the threshold value is set based on said equation (1) only when, in the input value interval between $V_a$ and $V_{a+1}$ (where 0≦a<N−1), the input value v is greater than a constant $K_a$ (where $V_a<K_a<V_{a+1}$).

* * * * *